Figure 1:
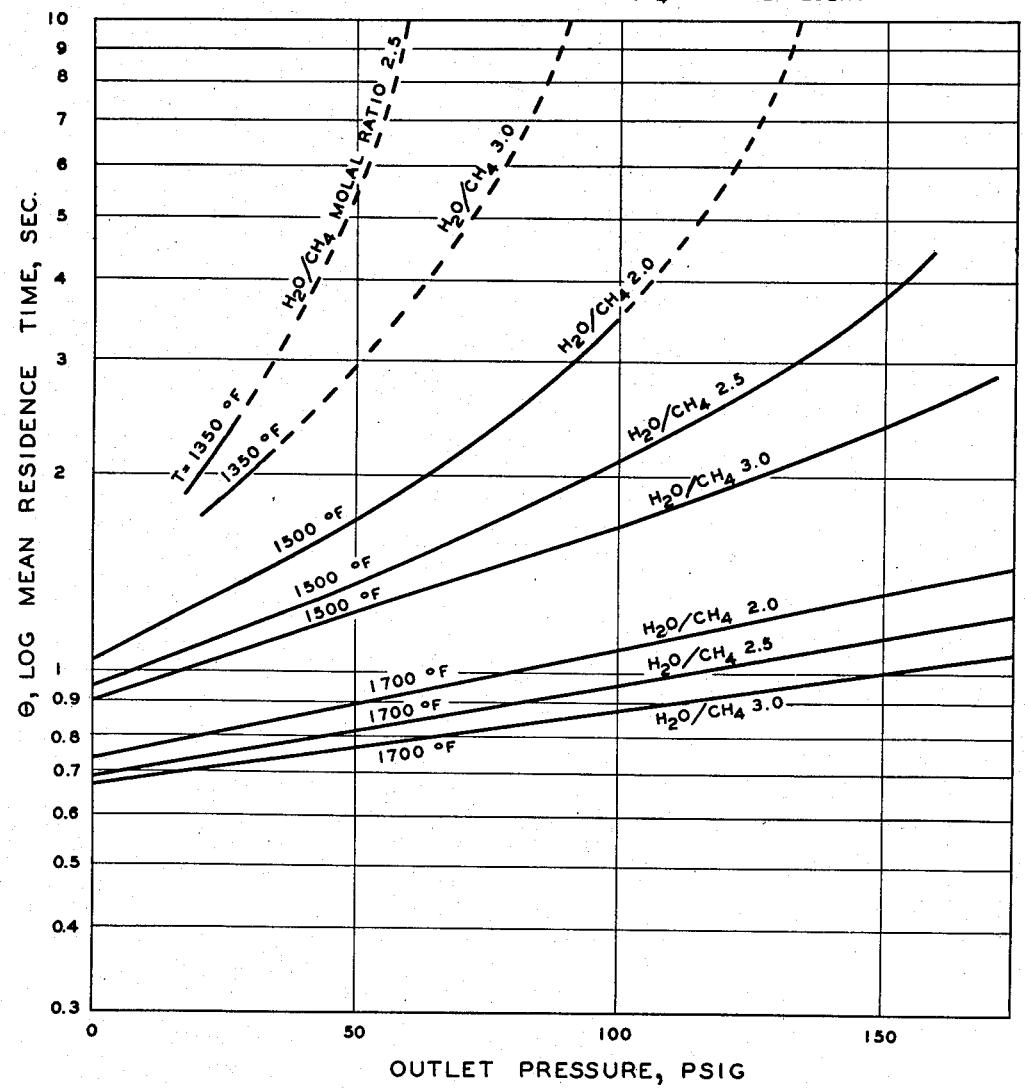

RESIDENCE TIME IN METHANE REFORMING
(CATALYST OF TABLE II) 6% $CH_4$ IN DRY EFFLUENT

May 5, 1964   J. B. DWYER ETAL   3,132,010
REFORMING OF GASEOUS HYDROCARBONS
Original Filed Jan. 4, 1957   3 Sheets-Sheet 3

INVENTORS
JOHN B. DWYER
JOSEPH W. JEWELL
WILLIAM B. JOHNSON
HENRY G. McGRATH
LOUIS C. RUBIN
BY *G. H. Palmer*
*Cruzan Alexander*
ATTORNEYS

United States Patent Office 3,132,010
Patented May 5, 1964

3,132,010
REFORMING OF GASEOUS HYDROCARBONS
John B. Dwyer, Garden City, N.Y., Joseph W. Jewell, New London, N.H., William B. Johnson, Peapack, and Henry G. McGrath, Union, N.J., and Louis C. Rubin, La Jolla, Calif., assignors to Pullman Incorporated, a corporation of Delaware
Continuation of application Ser. No. 632,599, Jan. 4, 1957. This application Nov. 8, 1962, Ser. No. 236,776
8 Claims. (Cl. 48—196)

This invention relates to the conversion of normally gaseous hydrocarbons to hydrogen and carbon monoxide. In one aspect this invention relates to the reforming of methane or natural gas with steam and/or carbon dioxide to produce hydrogen and carbon monoxide for subsequent use, such as in the synthesis of hydrocarbons and oxygenated organic compounds in the presence of a suitable synthesis catalyst. Other uses of hydrogen and carbon monoxide mixtures include the preparation of a gas for ammonia synthesis and the preparation of a gas for the reduction of iron oxide to produce sponge iron. This application is a continuation-in-part of application Serial No. 33,572, filed January 27, 1953, now abandoned. This application is a continuation of application Serial No. 632,599, filed January 4, 1957, now abandoned, which in turn is a continuation-in-part of application Serial No. 333,572, filed January 27, 1953.

Reforming of methane with steam to produce hydrogen and carbon monoxide has been known for some time in the prior art. Normally, reforming in tubular type furnaces has been carried out at atmospheric pressure and at space velocities not higher than about 200 or 300 volumes per hour per volume of catalyst. With conventional catalysts and conventional types of reforming furnaces the above space velocities were considered maximum for the production of a gas which did not contain excessive amounts of unconverted methane because of increasing pressure drop and consequent higher pressure at the hot end of the tube. It has been the desire for some time to achieve the reforming of methane to produce hydrogen and carbon monoxide without excessive unconverted methane in the product under higher pressures and higher space velocities. However, such conditions have not been achieved. Higher space velocities are desirable because it means a higher conversion to hydrogen and carbon monoxide per pound of metal tubing in the furnace thus decreasing the very high cost of the furnace. It is further desirable to increase both the pressure and space velocity in order to increase the capacity of the furnace and thus reduce required catalyst inventory. Pressure operations are particularly advantageous as the higher space velocities and much greater endothermic heat of reaction per tube results in greater heat transfer per unit tube surface area without any increase in metal temperature. Pressure operations also decrease the cost of subsequent compression, such as when using the hydrogen and carbon monoxide gas formed for the production of hydrocarbons by the Fischer-Tropsch reaction under elevated pressures, or in ammonia synthesis, or synthesis of methanol or isobutanol.

It is an object of this invention to provide a method and apparatus for achieving higher space velocities and pressures for the reforming of normally gaseous hydrocarbons to hydrogen and carbon monoxide.

Another object of this invention is to decrease the cost of the reforming furnace.

Yet another object is to produce a gas rich in hydrogen and carbon monoxide with a low concentration of unconverted feed gas.

Still another object of this invention is to provide a more efficient process for the conversion of methane to hydrogen and carbon monoxide.

Yet a further object of this invention is to provide a method for decreasing the cost of subsequent compression of the reforming gases for use in the synthesis of hydrocarbons under elevated pressures.

Still another object is to provide a furnace design for the reforming of methane to hydrogen and carbon monoxide at high temperatures and high pressures.

Various other objects and advantages will become apparent to those skilled in the art from the accompanying description and disclosure.

According to this invention, hydrocarbons, such as methane, ethane, propane, butane, natural gas, liquefied petroleum gas, or naphtha are reformed with steam, or steam and carbon dioxide or carbon dioxide alone in a suitable reforming furnace at an outlet temperature between about 1350° F. and about 1700° F., preferably above 1450° F., at an inlet pressure above 25 pounds per square inch. The tubes in the furnace contain a reforming catalyst through which the hydrocarbon and steam and/or carbon dioxide are passed are at least 2½ inches in diameter (O.D.) and not more than 5 inches in diameter (O.D.). Preferably the outside diameter of the tubes is between about 3 and about 4½ inches. The maximum tube metal temperature should not be in excess of that which the tubes can safely withstand at the pressure employed and is usually between about 1600° F. and about 1800° F. depending, of course, upon the type of metal used for the tube. For most efficient operations, the pressure is maintained above 50, and preferably between about 65 and about 150, pounds per square inch gage and the outlet temperature is maintained between about 1350° F. and about 1700° F., preferably between about 1450° F. and about 1600° F., with a nickel oxide catalyst.

The catalyst of this invention is preferably a nickel oxide supported catalyst having a diameter between about ¼" and about ½" in the form of spheres or extruded pellets between about ¼" and about ½" in length. High space velocities can be used, particularly when such catalyst is modified with about 15 to 25 weight percent calcium oxide, preferably between about 21 and about 23 weight percent and/or magnesium oxide in an amount between about 5 and about 15 weight percent. The support for the catalyst may be synthetic or naturally occurring and the modifiers may be added or originally present in the support. Other catalysts of high activity may be employed in this invention without departing from the scope thereof.

The ratio of steam and/or carbon dioxide to methane equivalent is maintained between about 1 and about 3. A suitable mol ratio of about 2.1 to about 2.6 has been found satisfactory. Reforming with steam alone, the ratio of steam to methane equivalent should be at least 1.8 in order to prevent excess carbon formation; with $CO_2$ present this value may be lower. In employing the present invention in a synthesis process, approximately 100 percent carbon utilization is realized by recycling carbon dioxide from the synthesis reactor.

In order to achieve maximum efficiency at high space velocities and high pressures preheating the methane steam reactants to a temperature above 400° F. and not higher than about 1250° F. is practiced. The preferred preheating temperature is between about 800° F. and about 1150° F. for economical reasons of preheater construction. Under the preferred conditions of operation ordinarily not more than 6 mol percent methane is found in the exit gases. In some instances and with some catalysts less than about 1 or 2 percent of methane is obtained in the effluent gases at the preferred conditions.

In accordance with this invention it has been found that higher pressures and consequent increased space velocities may be employed for producing an effluent gas containing a comparable methane content than with conventional reforming processes known today. The present invention permits operations resulting in a closer approach to theoretical equilibrium in the effluent than heretofore realizable. Generally, an effluent containing a relatively small amount of methane may be obtained by operating in accordance with this invention at space velocities in excess of 700 volumes of methane equivalent per hour per volume of catalyst in the tubes of the furnace. With highly active catalysts, a low methane content of the effluent gas is obtained with space velocities as high as 1000 to 2000 volumes of methane equivalent per hour per volume of catalyst. Of course, it is to be recognized that in determining the allowable space velocity (outlet pressure) for any particular methane content of the effluent gas the theoretical equilibrium as determined by feed composition and outlet temperature must be correlated against the attainable approach to equilibrium as determined by the residence time and the efficiency (or mean rate of reaction) in the reaction zone.

As an example of such a correlation, FIGURE 1 of the drawings shows curves for the various operating conditions of the present invention with a moderately active catalyst to produce not more than 6 mol percent methane in the dry effluent. From these curves of FIGURE 1 for any given operating conditions the maximum residence time may be determined to produce a maximum of 6 mol percent methane in the effluent. The relation of the various operating conditions to residence time and gas composition is readily evident from the curves of FIGURE 1. For any particular exit gas composition containing less than 6 mol percent methane the residence time must be correspondingly increased. Similarly, for higher permissable methane in the exit gas the residence time may be correspondingly decreased. The curves of FIGURE 1 were based upon experimental runs made on a moderately active catalyst of the following approximate composition:

*Table I*

| Components: | Weight percent |
|---|---|
| NiO | 26 |
| $Al_2O_3$ | 21–22 |
| $SiO_2$ | 34–35 |
| MgO | 8–10 |
| CaO | 0.1–1 |
| $Cr_2O_3$ | 0.1–1 |
| $Fe_2O_3$ | 2–4 |
| $K_2O$ | Trace |

Figure 2:
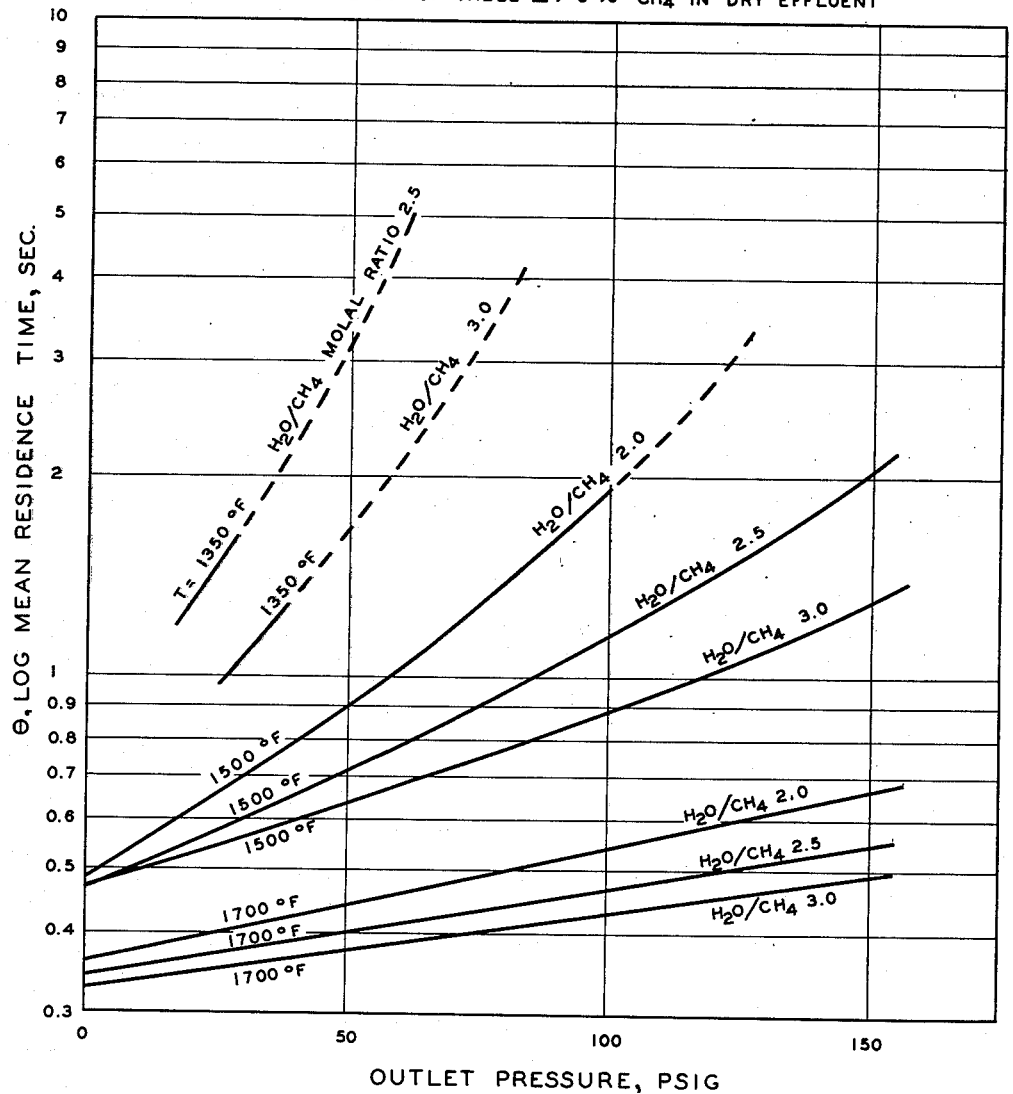

FIGURE 2 of the drawing contains similar curves to FIGURE 1 but is, however, based upon a more active catalyst. It is seen from the curves of FIGURE 2 that the relationship of the various operating variables is the same as that of FIGURE 1. The higher activity of the catalyst, however, permits the use of shorter residence times to obtain the same effluent gas composition. Thus, space velocities between 1200 and 1500 are suitable. The composition of the catalyst employed in the runs made to determine the curves of FIGURE 2 is shown below:

*Table II*

| Components: | Weight percent |
|---|---|
| NiO | 22 |
| $Al_2O_3$ | 13 |
| $SiO_2$ | 24 |
| MgO | 11–12 |
| CaO | 22 |
| $Cr_2O_3$ | 1–2 |
| $Fe_2O_3$ | 3–4 |
| $K_2O$ | Trace |
| Sulfates | Trace |
| Carbonates | Trace |

These curves were based upon an effluent gas containing 6 mol percent methane because such composition is typical of many gases required containing hydrogen and carbon monoxide. 6 mol percent methane is about the maximum methane tolerable for producing hydrogen for use in such processes as hydrogenation and Fischer-Tropsch. Thus when producing a gas for such processes in which the maximum methane content is 6 mol percent the residence time must be maintained at least that determined by FIGURES 1 and 2 for the respective catalysts.

The use of small tubes in the reforming furnace materially increases the surface area of the tube in comparison with the volume inside the tube. This increase in surface to volume ratio of the tubes permits a corresponding increase in the weight of reactants heated to the reaction temperature without an increase in the outside tube metal temperature. This factor substantially decreases the cost of the furnace per unit weight of reactants. Although smaller tubes are ordinarily more expensive than larger tubes, the increase in weight throughput permissible with smaller tubes more than offsets this added expense of the smaller tubes within certain limits.

Increased weight of reactants per volume of tube may be achieved by increase in pressure. However, it was contemplated that an increase in pressure at the same tube temperature for a given outlet gas composition would result in rupture of the tube and failure of the furnace. Trials at increased pressures above 50 pounds per square inch gage at the same calculated tube temperature (same furnace temperature) revealed that the higher reaction rates per unit volume of catalyst (or per unit area of the containing tube) actually reduced rather than raised the outside wall temperature of the tube because the endothermic heat of reaction per unit volume of catalyst was higher than had been expected from calculations. Contrary to previous practice and calculations, it is, therefore, possible in an indirect heat exchange tubular furnace to use outlet tube temperatures above 1450° F. and as high as 1700° F. at outlet pressures above 50 and as high as 100 to 200 pounds per square inch gage without tube rupture.

Experimental operations have demonstrated that the mechanical-thermal development of the gas producing unit permits satisfactory operation at pressures substantially above atmospheric which results in better space efficiency and thus make it even more profitable to use what had been previously considered uneconomic design. This increase in space efficiency had never been demonstrated prior to our experimental operation. The higher the outlet temperature at any given pressure, the lower the methane content of the effluent gas at equilibrium and the more favorable the compositions, both as to methane and carbon dioxide for the subsequent uses cited. No matter what improvement may be made in available tubular material, the discovery that smaller tube size provides increased efficiency, due to the relatively greater heat input capacity without increase in metal temperature, will still hold.

The tubes presently preferred are seamless extruded tubes made of 25–20 stainless steel or Inconel. Tubes below 3″ O.D. are not usually practical or feasible because the decrease in reaction space and increase in cost of tubes per unit volume of reactant space is not offset by increase in reactant rate (pound basis) at these small diameters.

Residence time used in FIGURES 1 and 2 is determined by dividing the length of the reactor by the log mean velocity of the steam-methane reactants in the reaction tube calculated by neglecting the volume occupied by the catlayst. Any similar measure of mean volume may be correlated in the same manner as in FIGURES 1 and 2. Methane equivalent is defined as the number of carbon atoms in the hydrocarbon feed mixture calculated as methane.

Figure 3:
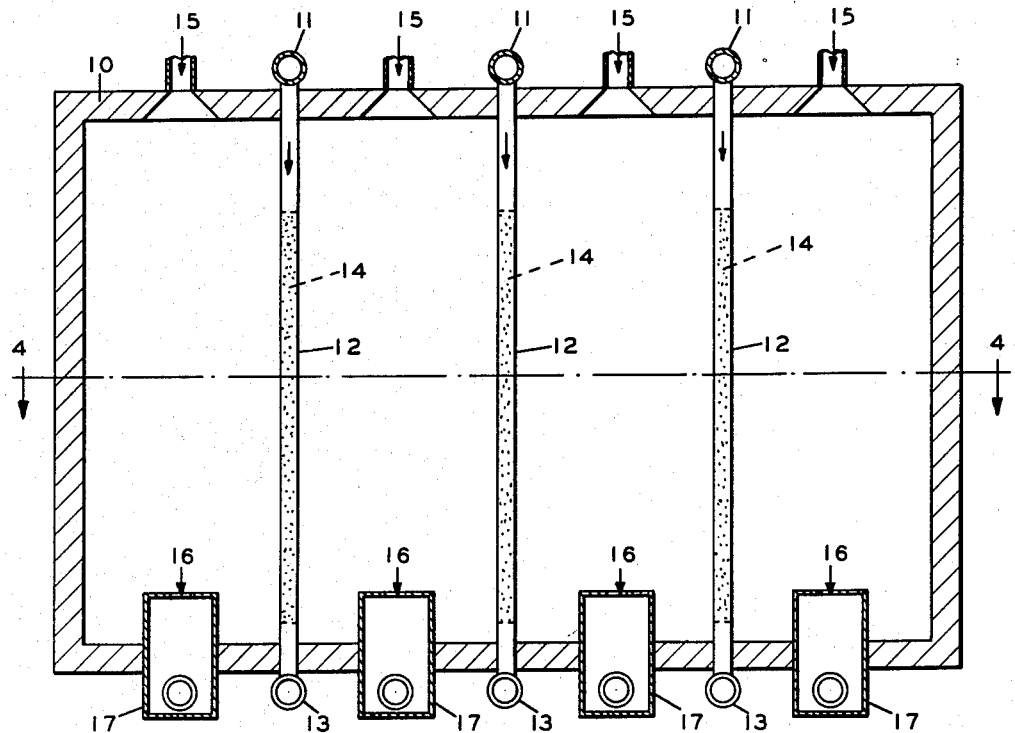
Figure 4:
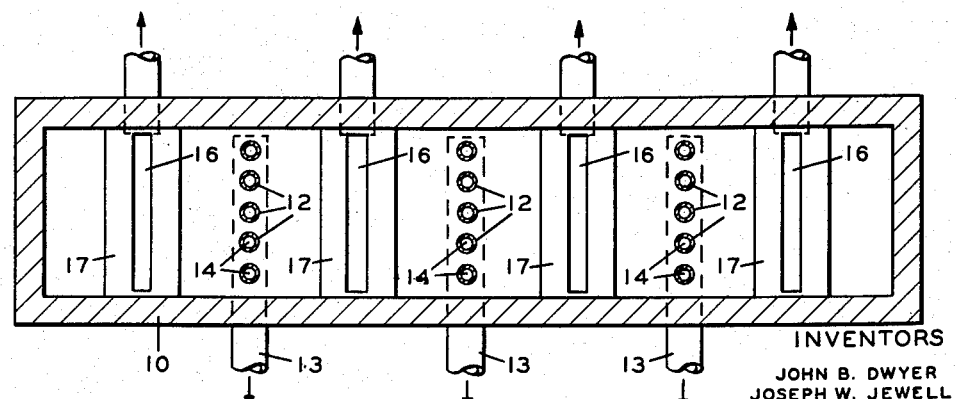

For a better understanding of the present invention and the type of furnace to be employed, reference will be made to FIGURE 3 of the drawings which diagrammatically illustrates a furnace in cross-section and in elevation. FIGURE 3 is an elevation view of the furnace while FIGURE 4 is a view taken along line 4—4 of FIGURE 3. Element 10 represents the casing of the furnace which is constructed of conventional refractory material. Combustible gases are introduced into the furnace through inlets 15. These gases burn in the furnace between tubes 12 and are removed therefrom through longitudinal openings 16 and passed through manifolds 17 to a conventional stack or heat recovery equipment. Tubes 12 are spaced vertically in the furnace across the furnace in a plurality of consecutive tubes. Preferably at least 5 tubes are employed for each section of tubing, as shown. Element 11 represents a manifold for introducing methane and steam into tubes 12. Tubes 12 are filled with catalyst indicated by numeral 14 and the gases pass downwardly through the tubes in concurrent heat exchange with the burning gases and are withdrawn through manifold 13. A suitable furnace design includes a furnace height of about 25 feet, a furnace length of about 20 feet and a furnace width of about 5½ feet. Five tubes in three sections having an outside diameter of 3½ inches are used for the reforming section. The reforming tubes are spaced about 9 inches apart. Restrictions in the form of orifice plates (not shown) are used at the inlet of the tubes to provide sufficient pressure drop to insure uniform flow of gases to all tubes and consequent uniform heat load. The latter is essential to control the maximum tube metal temperature and a satisfactory mean composition of the effluent.

The following tabulation of data (Table III) shows the results obtained for the reforming of propane in runs 1 to 4 and methane in runs 5 to 8 using a catalyst of the composition of Tables I and II and represents only a small portion of the data used for determining the curves of FIGURES 1 and 2. The tabulation is in conventional form showing the conditions of operations and results in a furnace similar to the one shown in the drawing. The reaction tubes of the runs of Table III were 2 inch (I.D.) filled with about 11 and one half feet of the catalyst shown in Table II. The bulk density of the catalyst was about 71 pounds per cubic foot and the particle density was about 2.06 grams per cubic centimeter. The catalyst was in the form of extruded pellets ⅜″ x ⅜″.

*Table III*

| Run No | 1 | 2 | 3 | 4 | 5 | 6 | 7 | 8 |
|---|---|---|---|---|---|---|---|---|
| Length of period, hrs | 8 | 8 | 4 | 2 | 8 | 4 | 8 | 6 |
| Reactor temp., °F.— | | | | | | | | |
| Inlet | 1,000 | 1,000 | 1,060 | 1,000 | 1,030 | 1,000 | 1,000 | 1,000 |
| Outlet | 1,450 | 1,380 | 1,400 | 1,450 | 1,465 | 1,495 | 1,450 | 1,455 |
| Furnace: | | | | | | | | |
| Top | 1,545 | 1,600 | 1,615 | 1,585 | 1,575 | 1,550 | 1,625 | 1,660 |
| 2 | 1,490 | 1,555 | 1,540 | 1,575 | 1,520 | 1,500 | 1,620 | 1,645 |
| 3 | 1,440 | 1,495 | 1,495 | 1,625 | 1,620 | 1,610 | 1,655 | 1,665 |
| 4 | 1,420 | 1,450 | 1,440 | 1,575 | 1,485 | 1,480 | 1,590 | 1,625 |
| 5 | 1,605 | 1,615 | 1,635 | 1,610 | 1,630 | 1,635 | 1,660 | 1,700 |
| Bottom | 1,550 | 1,575 | 1,580 | 1,600 | 1,620 | 1,610 | 1,625 | 1,675 |
| Reactor pres.: Inlet, p.s.i.g | 32.5 | 41.6 | 41.5 | 63.3 | 34.8 | 31.0 | 46.2 | 58.4 |
| Flows— | | | | | | | | |
| Feed: [1] | | | | | | | | |
| S.c.f.h | 90.8 | 105.6 | 113.1 | 108.5 | 212.9 | 208.5 | 329.0 | 405.0 |
| Lbs./hr | 10.5 | 12.3 | 13.1 | 12.6 | 9.0 | 8.8 | 13.9 | 17.1 |
| Steam (Orifice): | | | | | | | | |
| S.c.f.h | 576 | 678 | 678 | 699 | 484 | 474 | 676 | 853 |
| Lb./hr | 27.9 | 32.2 | 32.2 | 33.2 | 23.0 | 22.5 | 32.1 | 40.5 |
| Steam (Calc.): [2] | | | | | | | | |
| S.c.f.h | 624 | 638 | 657 | 613 | 501 | | 497 | 831 |
| Lb./hr | 30.0 | 30.3 | 31.2 | 29.1 | 23.8 | | 23.6 | 39.5 |
| Outlet Gas (Dry): [3] | | | | | | | | |
| S.c.f.h | 908 | 1,025 | 1,102 | 1,078 | 858 | 865 | 1,138 | 1,551 |
| Lb./hr | 27.4 | 30.6 | 32.8 | 30.3 | 22.8 | 22.2 | 29.8 | 38.1 |
| Outlet Water: [4] | | | | | | | | |
| S.c.f.h | 301 | 282 | 285 | 232 | 273 | 236 | 268 | 3.87 |
| Lb./hr | 14.3 | 13.4 | 13.5 | 11.0 | 13.0 | 11.2 | 12.7 | 18.4 |
| Space Velocities: | | | | | | | | |
| Inlet-v./hr./v | 998 | 1,160 | 1,243 | 1,194 | 780 | 764 | 1,205 | 1,483 |
| Outlet-v./hr./v | 1,625 | 1,695 | 1,821 | 1,766 | 1,538 | 1,516 | 1,894 | 2,611 |
| Steam/equiv. $CH_4$ (Obs.) | 2.1 | 2.1 | 2.0 | 2.1 | 2.3 | 2.3 | 2.1 | 2.1 |
| Steam/equiv. $CH_4$ (Calc.) | 2.3 | 2.0 | 1.9 | 1.9 | 2.4 | | 1.5 | 2.1 |
| Outlet Gas, vol. percent (M. S.): | | | | | | | | |
| $CO_2$ | 10.0 | 8.8 | 8.5 | 5.5 | 7.3 | 7.0 | 6.2 | 6.2 |
| CO | 16.8 | 18.0 | 18.9 | 21.3 | 15.8 | 16.2 | 17.7 | 15.9 |
| $H_2$ | 69.2 | 67.7 | 68.0 | 68.8 | 72.7 | 74.1 | 71.9 | 72.8 |
| $CH_4$ | 3.2 | 4.1 | 3.4 | 3.4 | 1.7 | 0.9 | 3.0 | 4.0 |
| $N_2$ | 0.8 | 1.4 | 1.2 | 1.0 | 2.5 | 1.8 | 1.2 | 1.1 |
| Mol. weight | 11.29 | 11.32 | 11.27 | 10.66 | 10.06 | 9.75 | 9.94 | 9.30 |
| $H_2$:CO | 4.1 | 3.8 | 3.6 | 3.2 | 4.6 | 4.6 | 4.1 | 4.6 |
| $CO_2$:CO | 0.60 | 0.49 | 0.45 | 0.26 | 0.46 | 0.43 | 0.35 | 0.39 |
| Conversions: | | | | | | | | |
| Percent $CH_4 \longrightarrow CO_2$ | 33.3 | 28.5 | 27.6 | 18.2 | 29.4 | 29.1 | 21.4 | 23.8 |
| Percent $CH_4 \longrightarrow CO+CO_2$ | 89.4 | 86.7 | 89.0 | 88.8 | 93.2 | 96.3 | 89.6 | 84.7 |
| Material Balances, percent (Basis Calc. Steam): | | | | | | | | |
| Carbon | 100 | 100 | 100 | 100 | 100 | 100 | 100 | 100 |
| Hydrogen | 100 | 100 | 100 | 100 | 100 | 100 | 100 | 100 |
| Oxygen | 102 | 101 | 104 | 93 | 107 | 105 | 123 | 99 |
| Weight ($N_2$—Free) | 105 | 101 | 102 | 97 | 104 | 103 | 111 | 98 |

Catalyst bed data—vol. cu. ft., 0.273; weight-lb., 19.4:
[1] Feed: Propane in runs 1 to 4 and methane in runs 5 to 8.
[2] Assuming 100% hydrogen balance.
[3] Assuming 100% carbon balance.
[4] Includes: (1) Condensed water; (2) Water vapor in outlet gas (assumed saturated at 14.7 p.s.i.a. and 75° F.).

Table IV below shows typical runs with a moderately active catalyst of a composition corresponding to that shown in Table I for reforming of natural gas. The reaction tubes for the runs of Table IV had a 3 inch diameter (I.D.).

*Table IV*

| Run No. | 1 | 2 | 3 |
|---|---|---|---|
| Equiv. CH$_4$, v./hr./v.: | | | |
| Inlet | 758 | 1,022 | 1,000 |
| Outlet | 5,750 | | 3,830 |
| Temp. in., °F | 1,000 | 1,000 | 1,000 |
| Temp. out., °F | 1,515 | 1,547 | 1,575 |
| Press. in., p.s.i.g | 41 | 73.7 | 72 |
| Press. out., p.s.i.g | 21 | 50.6 | 50.5 |
| Stm./CH$_4$ equiv | 2.62 | 2.42 | 2.01 |
| Inlet velocity,[1] f.p.s | 13.3 | 10.7 | 9.3 |
| Outlet velocity,[1] f.p.s | 38.7 | 28.1 | 25.7 |
| Residence time,[2] sec | 1.03 | 1.37 | 1.53 |
| Equiv. CH$_4$ disappearance | 78.8 | | 73.4 |
| CH$_4$ in product | 5.9 | 7.5 | 6.8 |
| H$_2$:CO ratio | 4.90 | | 4.77 |
| CO$_2$:CO ratio | 0.57 | | 0.46 |

[1] Superficial velocity, based on empty tube.
[2] Tube length, ft.

As an additional example of the gas reforming process of this invention, particularly as applied to an ammonia synthesis plant, a reforming furnace was built having 315 tubes each having a 3½ inch outside diameter and a .28 inch minimum wall thickness. The catalyst bed length was 24½ feet.

The catalyst used contained the following ingredients: SiO$_2$ 26.3%, Al$_2$O$_3$ 29.2%, Fe$_2$O$_3$ 0.7%, NiO 24.8%, MgO 2.8% CaO 13.9%.

A natural gas feed having the following composition was used: CH$_4$ 83.2 mol percent, C$_2$H$_6$ 9.5 mol percent, C$_3$H$_8$ 3.8 mol percent, C$_4$H$_{10}$ and C$_5$H$_{12}$ 0.8 mol percent, N$_2$ 2.3 mol percent, CO$_2$ 0.3 mol percent. The natural gas was passed through the furnace at an outlet temperature of 1490° F. and an outlet pressure of 125 p.s.i.g. Steam was fed to the furnace tubes at a mol ratio to methane of 2.14. The space velocity was 840 volumes of methane equivalent per hour per volume of catalyst.

The effluent analysis on a mol basis was as follows: H$_2$ 73%, N$_2$ 1%, CH$_4$ 6%, CO 12.2%, CO$_2$ 7.8%.

As still another example of the reforming process of this invention, particularly as applied to a plant for the production of sponge iron by the reduction of iron ore, a furnace was built containing 14 tubes having an outside diameter of 4½ inches and an average wall thickness of 0.37 inch. The catalyst bed depth in each tube was 20 feet 1 inch.

A natural gas feed having the following composition was used: CH$_4$ 95.5 mol percent, C$_2$H$_6$ 2.50 mol percent, C$_3$H$_8$ 0.43 mol percent, C$_4$H$_{10}$ 0.56 mol percent, N$_2$ 0.56 mol percent, CO$_2$ 0.10 mol percent.

The feed was passed through the furnace tubes containing the same catalyst as described above with respect to FIGURE 2. The space velocity was 1038 volumes of methane equivalent per hour per volume of catalyst. Steam was fed at a steam to methane equivalent mol ratio of 1.9. The temperature at the tube outlet was 1495° F. and the pressure at the tube outlet was 54 p.s.i.g.

The analysis of the effluent was as follows: CO$_2$ 6.20 mol percent, CO 14.80 mol percent, H$_2$ 72.00 mol percent, CH$_4$ 6.80 mol percent, N$_2$ 0.20 mol percent.

Having described our invention, we claim:

1. A process for reforming a low boiling hydrocarbon to produce a product containing hydrogen which comprises passing a preheated mixture comprising a low boiling hydrocarbon and steam as substantially the sole reforming agent at a steam to methane equivalent ratio of at least 1.8:1 through a multitubular reaction zone in a single stage in the presence of a nickel oxide catalyst at space velocities at standard conditions corresponding to at least 700 volumes of methane equivalent per hour per volume of catalyst at an outlet pressure of at least 50 pounds per square inch gage, maintaining the outlet temperature of said tubular reaction zone between about 1350° F. and about 1700° F. by indirect heat exchange with a burning fuel and producing an effluent gas in said single stage containing hydrogen without an excessive amount of unconverted low boiling hydrocarbon.

2. A process for reforming a low boiling hydrocarbon to produce hydrogen and carbon monoxide which comprises passing a gaseous mixture comprising a low boiling hydrocarbon and steam as substantially the sole reforming agent, said mixture having a steam to methane equivalent ratio of between about 2.1:1 and about 2.6:1 and being preheated to a temperature between about 400° F. and about 1200° F. through a multitubular reaction zone in a single stage in the presence of a nickel oxide supported catalyst having a diameter and length between about ¼ inch and about ½ inch at space velocities at standard conditions corresponding to at least 700 volumes of methane equivalent per hour per volume of catalyst at an outlet pressure of at least 50 pounds per square inch gage, maintaining the outlet temperature of said tubular reaction zone between about 1350° F. and about 1700° F. by indirect heat exchange with the burning fuel which maintains the outside tube temperature of the reaction zone between about 1600° F. and about 1800° F. and producing an effluent gas in said single stage containing hydrogen and carbon monoxide and not more than about 6 mol percent unconverted low boiling hydrocarbon.

3. A process for reforming methane to produce hydrogen and carbon monoxide which comprises passing methane preheated to a temperature between about 800° F. and about 1150° F. and steam as substantially the sole reforming agent at a steam to methane equivalent ratio of between about 2.1:1 and about 2.6:1 through a multitubular reaction zone in a single stage in the presence of a nickel oxide supported catalyst having a diameter and length between about ⅜ inch and about ½ inch at space velocities at standard conditions corresponding to at least 700 volumes of methane per hour per volume of catalyst at an outlet pressure between about 65 and about 150 pounds per square inch gage, maintaining the outlet temperature of said tubular reaction zone between about 1450° F. and about 1600° F. by indirect heat exchange with the burning fuel which maintains the outside tube temperature of the reaction zone between about 1600° F. and about 1800° F. and producing an effluent gas in said single stage containing hydrogen and carbon monoxide and not more than about 6 mol percent unconverted methane.

4. A process for reforming methane to produce hydrogen and carbon monoxide which comprises passing steam as substantially the sole reforming agent and methane pre-heated to a temperature between about 800° F. and about 1150° F. in a mol ratio of between about 2.1:1 and about 2.6:1 through a multitubular reaction zone in a single stage in the presence of a nickel oxide catalyst supported on a silica alumina support containing between about 15 and about 25 weight percent calcium oxide modifier at an outlet pressure of at least 50 pounds per square inch gage, maintaining the outlet temperature of said tubular reaction zone between about 1350° F. and about 1700° F. by indirect heat exchange with the burning fuel and providing a residence time for the reactants corresponding to a space velocity of at least 700 volumes of methane per hour per volume of catalyst and producing an effluent gas in said single stage containing hydrogen and carbon monoxide and not more than 6 mol percent unconverted methane.

5. The process of claim 4 in which the outlet temperature of the reaction zone is maintained between about 1450° F. and about 1600° F.

6. The process of claim 4 in which the outlet pressure of the reaction zone is maintained between about 65 and about 150 pounds per square inch gage.

7. A process for reforming methane to produce hydrogen and carbon monoxide which comprises passing steam as substantially the sole reforming agent and methane preheated to a temperature between about 800° F. and about 1150° F. in a mol ratio of between about 2.1:1 and about 2.6:1 through a multitubular reaction zone in a single stage in the presence of a nickel oxide catalyst supported on a silica-alumina support at an outlet pressure of at least 50 pounds per square inch gage, maintaining the outlet temperature of said tubular reaction zone between about 1350° F. and about 1700° F. by indirect heat exchange with the burning fuel and providing a residence time for the reactants corresponding to a space velocity of at least 700 volumes of methane per hour per volume of catalyst and producing an effluent gas in said single stage containing hydrogen and carbon monoxide and not more than 6 mol percent unconverted methane.

8. In a process for reforming methane to produce hydrogen and carbon monoxide in which steam as substantially the sole reforming agent and methane are preheated to a temperature between about 800° F. and about 1150° F. and are passed through a multitubular reaction zone in a single stage in the presence of a nickel oxide supported catalyst and the outlet temperature of said reaction zone is maintained between about 1350° F. and about 1700° F. by indirect heat exchange with a burning fuel, the improvement which comprises maintaining the outlet pressure of said reaction zone at least 50 pounds per square inch gage, maintaining a steam to methane mol ratio between about 2.1:1 and about 2.6:1 and providing a residence time for the reactants corresponding to a space velocity of at least 700 volumes of methane per hour per volume of catalyst whereby an effluent gas containing hydrogen and carbon monoxide and not more than 6 mol percent unconverted methane is produced in said single stage.

References Cited in the file of this patent

UNITED STATES PATENTS

| | | |
|---|---|---|
| 2,622,089 | Mayland | Dec. 16, 1952 |
| 2,625,470 | Roberts | Jan. 13, 1953 |

UNITED STATES PATENT OFFICE
CERTIFICATE OF CORRECTION

Patent No. 3,132,010                                    May 5, 1964

John B. Dwyer et al.

It is hereby certified that error appears in the above numbered patent requiring correction and that the said Letters Patent should read as corrected below.

Column 1, line 23, for "33,572" read -- 333,572 --; columns 5 and 6, Table III, under the heading "Run No. 8", and opposite "Outlet Water:4 S.c.f.h." for "3.87" read -- 387 --; column 7, Table IV, under the headings "2" and "3", strike out all brackets; same Table IV, under the heading "2" first item, "1022" should appear opposite "inlet" instead of as in the patent; same Table IV, under the heading "2", tenth item, "7.5" should appear opposite "$CH_4$ in product" instead of as in the patent.

Signed and sealed this 17th day of November 1964.

(SEAL)
Attest:

ERNEST W. SWIDER                                EDWARD J. BRENNER
Attesting Officer                                  Commissioner of Patents